(12) United States Patent
Spytek

(10) Patent No.: US 8,015,821 B2
(45) Date of Patent: Sep. 13, 2011

(54) APPARATUS AND METHOD FOR A GAS TURBINE ENTRAINMENT SYSTEM

(75) Inventor: Christopher J. Spytek, Park Ridge, IL (US)

(73) Assignee: Spytek Aerospace Corporation, Bensenville, IL (US)

(\*) Notice: Subject to any disclaimer, the term of this patent is extended or adjusted under 35 U.S.C. 154(b) by 851 days.

(21) Appl. No.: 12/013,085

(22) Filed: Jan. 11, 2008

(65) Prior Publication Data

US 2009/0178412 A1 Jul. 16, 2009

(51) Int. Cl.
*F02C 3/00* (2006.01)
*F02C 3/14* (2006.01)

(52) U.S. Cl. ............... 60/772; 60/39.17; 60/39.5

(58) Field of Classification Search ............ 60/772, 60/39.5, 746, 748, 39.17
See application file for complete search history.

(56) References Cited

U.S. PATENT DOCUMENTS

| | | | | |
|---|---|---|---|---|
| 2,828,608 A | \* | 4/1958 | Cowlin et al. | 60/746 |
| 3,012,402 A | \* | 12/1961 | Probert et al. | 60/722 |
| 3,397,535 A | \* | 8/1968 | Dechaux | 60/39.5 |
| 3,808,802 A | | 5/1974 | Tanasawa | |
| 3,915,619 A | | 10/1975 | Quigg et al. | |
| 3,919,840 A | | 11/1975 | Markowski | |
| 4,045,956 A | \* | 9/1977 | Markowski et al. | 60/746 |
| 4,433,540 A | \* | 2/1984 | Cornelius et al. | 60/39.511 |
| 4,653,278 A | | 3/1987 | Vinson et al. | |
| 5,025,622 A | | 6/1991 | Melconian | |
| 5,689,948 A | \* | 11/1997 | Frutschi | 60/39.17 |
| 6,119,459 A | | 9/2000 | Gomez et al. | |
| 6,192,669 B1 | \* | 2/2001 | Keller et al. | 60/804 |
| 6,272,840 B1 | | 8/2001 | Crocker et al. | |
| 6,389,815 B1 | | 5/2002 | Hura et al. | |
| 6,820,411 B2 | | 11/2004 | Pederson et al. | |
| 7,028,483 B2 | | 4/2006 | Mansour et al. | |
| 2002/0011064 A1 | | 1/2002 | Crocker et al. | |

FOREIGN PATENT DOCUMENTS

| | | |
|---|---|---|
| DE | 3626545 | 2/1987 |
| EP | 0 153 842 | 9/1985 |

OTHER PUBLICATIONS

Slide, "Current Design Realistic Turbine Vanes FY07-FY08+", 1pp.

\* cited by examiner

*Primary Examiner* — Ted Kim
(74) *Attorney, Agent, or Firm* — Pauley Peterson & Erickson

(57) ABSTRACT

This invention relates to an apparatus for an entrainment system of a vortex burning combustion chamber or a vortex burning inter-turbine burner in a gas turbine. The entrainment system rapidly and thoroughly mixes hot combustion gases with non-combustion gases to reduce the gas temperature before entering a turbine. The entrainment system includes a plurality of helical vanes forming trenches and resulting in a highly helical flow path. The highly helical flow path provides an increased residence time for mixing of the combustion gases and non-combustion gases. Radial cavities in the helical vanes, canted vane angles and varying geometries further facilitate mixing while reducing losses. This invention also includes a method of mixing combustion and non-combustion gases in an entrainment system.

20 Claims, 6 Drawing Sheets

APPARATUS AND METHOD FOR A GAS TURBINE ENTRAINMENT SYSTEM

BACKGROUND OF THE INVENTION

1. Field of the Invention

The present invention relates to an entrainment system for mixing combustion gases and non-combustion gases in vortex burning gas turbine engines.

2. Discussion of the Related Art

Gas turbines include an air compressor section, a burner section and a turbine section. The compressed air from the air compressor is split with a part used for combustion of the fuel and a part used to cool the combustion products down to a temperature compatible with the materials of construction of the turbine section. Insufficient mixing of the combustion products and the cooling air results in unfavorable temperature gradients reaching the turbine section causing thermal stresses, inefficiencies, operability problems and/or reliability issues.

Developments in gas turbines have led to vortex burning combustion chambers and vortex burning inter-turbine burners. Vortex burning devices may offer increased power, increased efficiency, decreased emissions and/or decreased weight by using compact and relatively short designs. However, these short designs may not allow sufficient mixing of the combustion products and the cooling air to result in efficient and reliable turbine operation. Known mixing systems employ a primarily axial orientation for the dilution air resulting a less than optimal mixing since the mixing length is based on the short width of the burner.

There is a need for an apparatus with a longer flow path to increase mixing of the combustion products and the cooling air without significantly increasing a mass or a size of the gas turbine.

There is a need and a desire for an apparatus resulting in a more uniform temperature profile of the gases supplied to the turbine section to increase efficiency and reliability.

SUMMARY OF THE INVENTION

The above identified needs are met at least in part by the entrainment system of this invention having a helical flow path. According to one embodiment of this invention, the gas turbine entrainment system for mixing combustion gases and non-combustion gases includes an axial body having a first end and a second end. The entrainment system is disposed within an inner radius of a vortex burning combustion chamber or a vortex burning inter-turbine burner. Desirably, the first end is in fluid communication with an air compressor and the second end is in fluid communication with a turbine.

The entrainment system also includes a plurality of helical vanes radially disposed with respect to the axial body where each of the helical vanes has a root attached to the axial body and a tip opposite the root. The vanes typically are radially disposed generally equally around the circumference of the axial body, similar to the flights of a screw.

The helical vanes form a plurality of trenches where each trench radially receives combustion gases from the tip towards the root and each trench receives non-combustion gases from the first end of the axial body to the second end of the axial body in a helical flow path to quench the combustion gases with the non-combustion gases. According to one embodiment of this invention, the trenches of the entrainment system are referred to as a DEEP TRENCH™ design or a DT™ design, such as, may be designated by a corresponding number, DT-3™ design, for example.

The helical flow path increases the residence time of the non-combustion gases under the burner and allows increased mixing resulting in a more uniform temperature profile before the turbine section. The angle of the helical flow path from an axis of the axial body includes any suitable sharp angle, bend or change in direction. An effective length of the helical flow path may include a multiple of the axial length of the axial body.

Radial cavities formed in a leading side of the helical vanes conduct combustion gases into the trench and increase mixing. The radial cavities include any suitable length and depth without compromising the structural integrity of the helical vane. According to one embodiment of this invention, three radial cavities are spaced substantially equally apart along a length of the helical vane.

A profile or cross section of each trench has as a canted V-shape at the tip and widens into a parallelogram shape at the root, and a width of each trench increases along a length of each helical vane from the first end of the axial body to the second end of the axial body, to reduce losses and according to one embodiment of this invention. Each trench may include a tilt of a suitable angle to further facilitate turbulence and/or mixing.

The invention also includes a method of mixing combustion and non-combustion gases in a gas turbine. The method includes the steps of compressing ambient air in an air compressor forming compressed air, splitting the compressed air into combustion air and non-combustion gases, mixing fuel and combustion air in a vortex combustion device, burning fuel and combustion air in a radial burner forming combustion gases, quenching the combustion gases with the non-combustion gases to form quenched gases in an entrainment system having helical canted vanes forming trenches, and powering a turbine with the quenched gases.

The split of the compressed air includes any suitable amount the combustion air and the non-combustion gases. A drawdown of the combustion gases into the trench occurs between the lengths of the canted helical vane.

BRIEF DESCRIPTION OF THE FIGURES

These and other objects and features of this invention will be better understood from the following descriptions taken in conjunction with the drawings wherein.

DETAILED DESCRIPTION

Gas turbines refer broadly to engine devices including an air compressor section, a combustion section and a turbine section. Gas turbines may be used in any number of applications, such as, for example, jet airplanes, helicopters, ships, trains, automobiles, tanks, power generation and any other suitable use in civilian, commercial, industrial, residential, military and/or government purposes.

Gas turbines may include any suitable mass flow rates, such as, between about 0.05 kg/s and about 5000 kg/s, and desirably between about 10 kg/s and about 500 kg/s, for example. Gas turbines may include any suitable size, configuration and/or power output, such as, between about 0.1 kw and 2000 mw, and desirably between about 10 kw and about 500 mw, for example.

Fuel for gas turbines broadly may include, for example, methane, propane, gasoline, diesel fuel, jet fuel, fuel oil, methanol, ethanol, coal and/or any other suitable combustible material from renewable or nonrenewable sources. Vortex burning combustion chambers utilize rapidly swirling gases to improve combustion efficiencies, reduce emissions, increase power and/or reduce weight.

Figure 1:
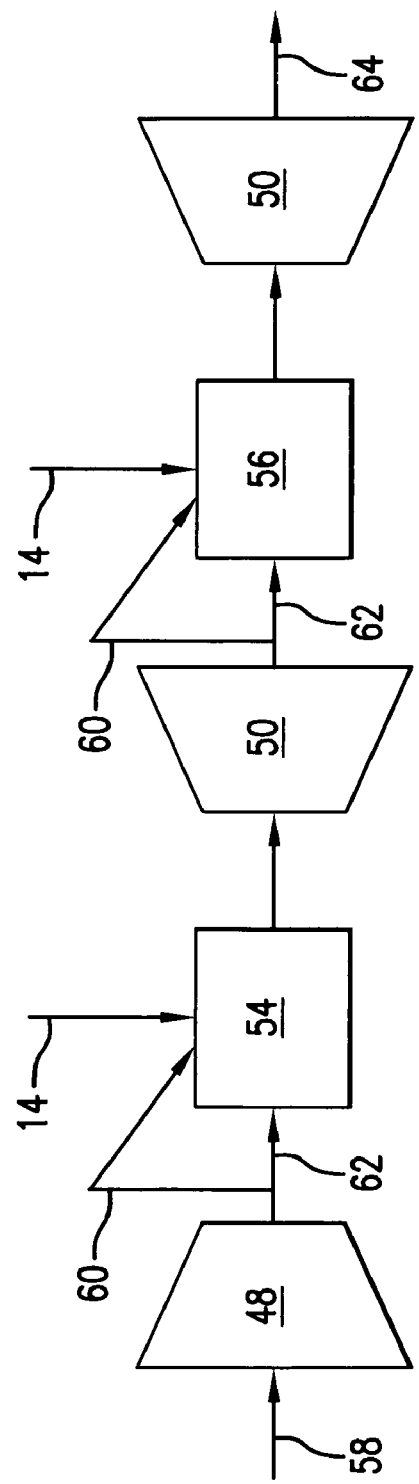
FIG. 1 is a schematic of a gas turbine, according to one embodiment of this invention.

As shown in FIG. 1 and according on one embodiment of this invention, air compressor 48 increases the pressure of air from inlet 58 and supplies combustion air 60 and cooling air 62. The split of combustion air 60 to cooling air 62 may include any suitable amount. Combustion air 60 may include between about 15 percent and about 40 percent, desirably between about 20 percent and about 30 percent, and more desirably about 25 percent of a mass of air flowing through air compressor 48, for example. Cooling air 62 may include between about 60 percent and about 85 percent, desirably between about 70 percent and about 80 percent, and more desirably about 75 percent of the mass of air flowing through air compressor 48, for example. Thus, about between about 70 percent to about 80 percent of the flow is available for cooling or dilution of combustion products, for example. Typically, gases going into the burner chamber enter around the periphery and burn circumferentially at approximately 50 m/sec flow speed (2500 g).

Combustion air 60 mixes with fuel 14 in vortex burning combustion chamber 54. Desirably, at least a stoichiometric amount of combustion air 60 is provided for burning fuel 14. Depending upon the type of fuel 14 and the air ratio, a combustion temperature within the vortex burning combustion chamber 54 may range from about 1600 degrees Celsius to about 2000 degrees Celsius. Typical materials of construction for turbine 50 cannot operate reliably at such a high temperature. The cooling air 62 is combined to quench the high combustion temperature to a lower level, such as, between about 985 degrees Celsius and about 1375 degrees Celsius, according to the design of turbine 50. Mixing refers to substantially combining two or more streams resulting in substantial uniformity of at least one of temperature, composition and/or any other suitable characteristic.

As shown in FIG. 1 and according to one embodiment of this invention, turbine 50 may supply combustion air 60 and cooling air 60 to vortex burning inter-turbine burner 56. Vortex burning inter-turbine burner 56 may have the characteristics described above regarding vortex burning combustion chamber 54. Desirably, vortex burning inter-turbine burner 56 provides inlet flow to another turbine 50 before exhaust 64. The use of afterburners is also possible.

Figure 2:
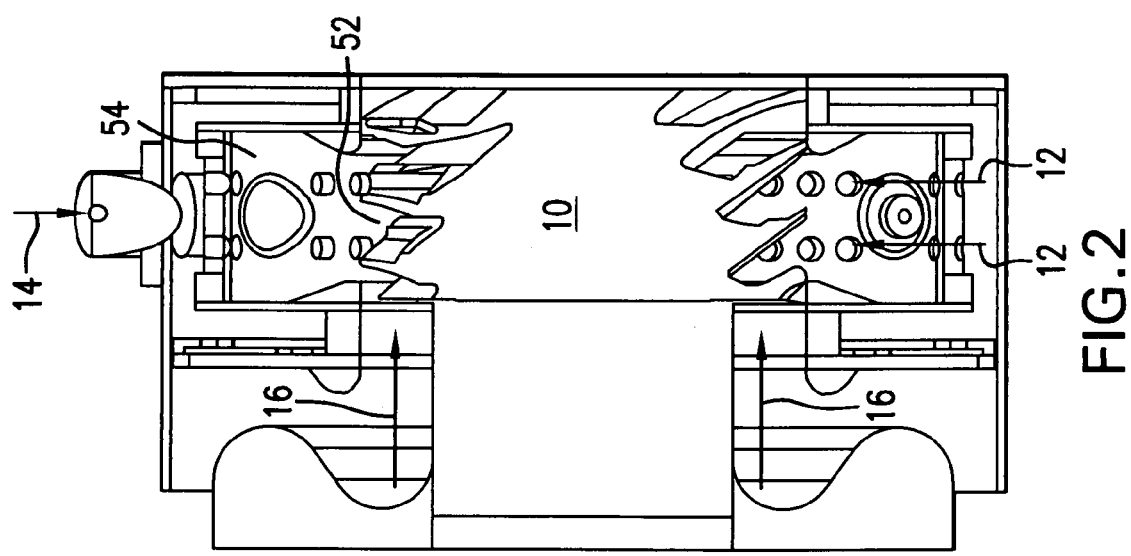
FIG. 2 is partial side sectional view of a vortex burning combustion chamber, according to one embodiment of this invention.

As shown in FIG. 2 and according on one embodiment of this invention, vortex burning combustion chamber 54 receives and combusts fuel 14 with combustion air 60 to form combustion gases 12. Desirably at least a portion of entrainment system 10 resides within inner radius 52 of vortex burning combustion chamber 54. Combustion gases 12 are mixed with non-combustion gases 16 in entrainment system 10 to cool or quench the temperature before turbine 50. Combustion gases 12 desirably flow in an inward radial direction before entering entrainment system 10 and turn into a helical or circumferential direction within entrainment system 10. Non-combustion gases 16 desirably flow in an axial direction before entering entrainment system 10 and turn into helical or circumferential direction within entrainment system 10.

Figure 4:
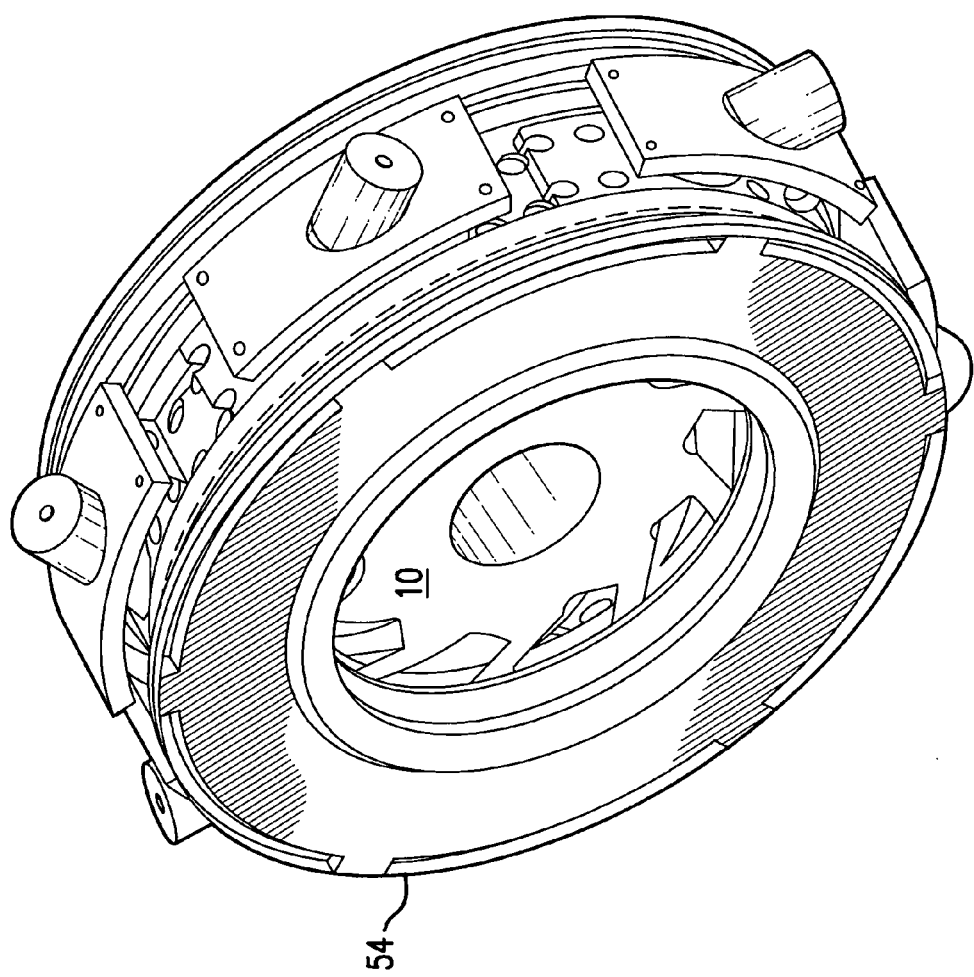
FIG. 4 is an assembled view of a vortex burning combustion chamber, according to one embodiment of this invention.

FIG. 4 shows an assembled view of vortex burning combustion chamber 54 including entrainment system 10 within an inner radius 52. A primary function of entrainment system 10 is to forcibly mix combustion gases 12 spinning within the vortex burner with non-combustion gases 16 flowing through entrainment system 10. Desirably, a gas turbine engine has about 20 percent to about 30 percent of the net engine mass airflow going through the vortex combustor with the balance moving through entrainment system 10. According to one embodiment of this invention, entrainment system 10 uses highly helical flow channels to entrain the combustor products into the entrainment flows establishing a "quick-quench".

Figure 3:
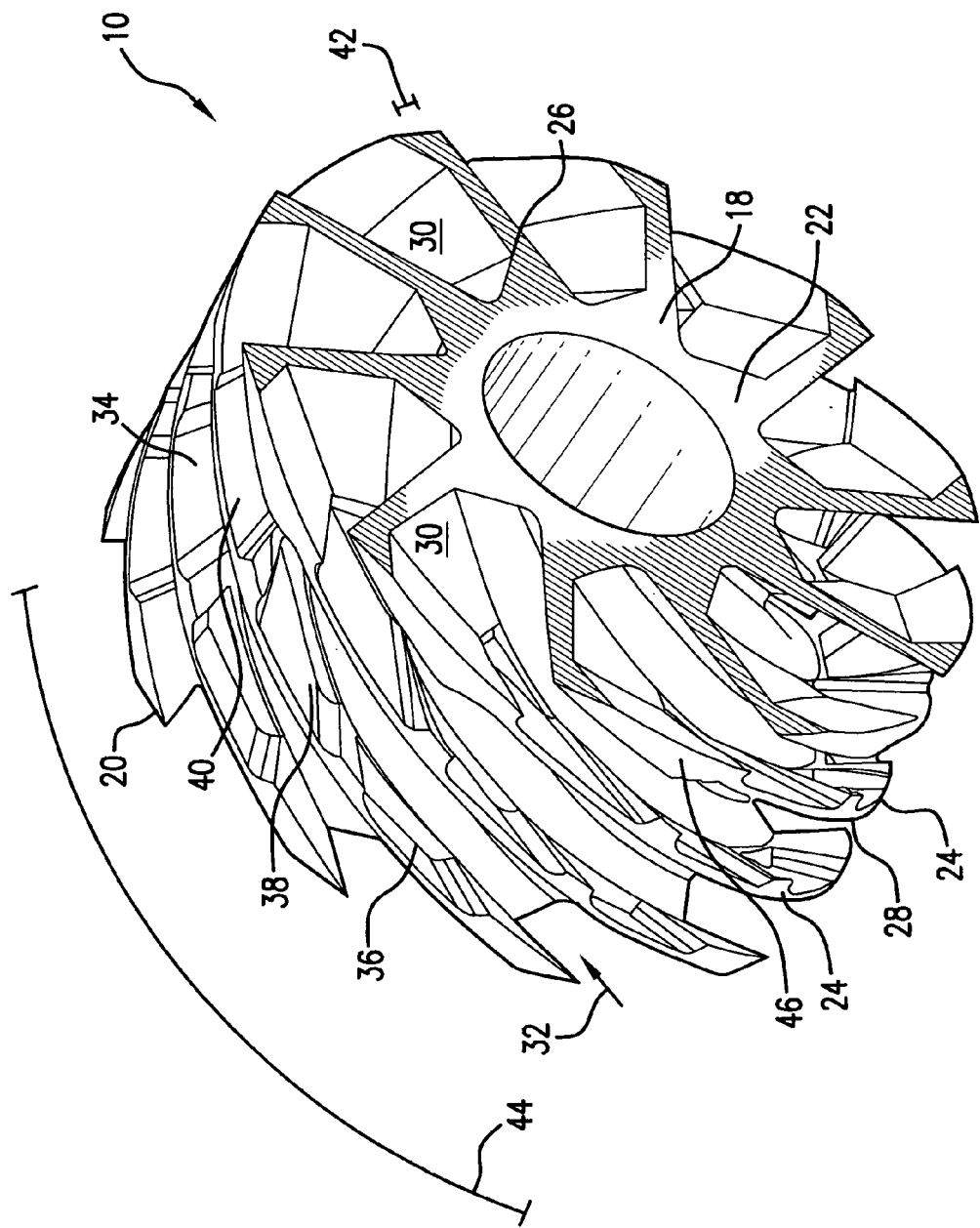
FIG. 3 is an isometric view of an entrainment system, according to one embodiment of this invention.
Figure 6:
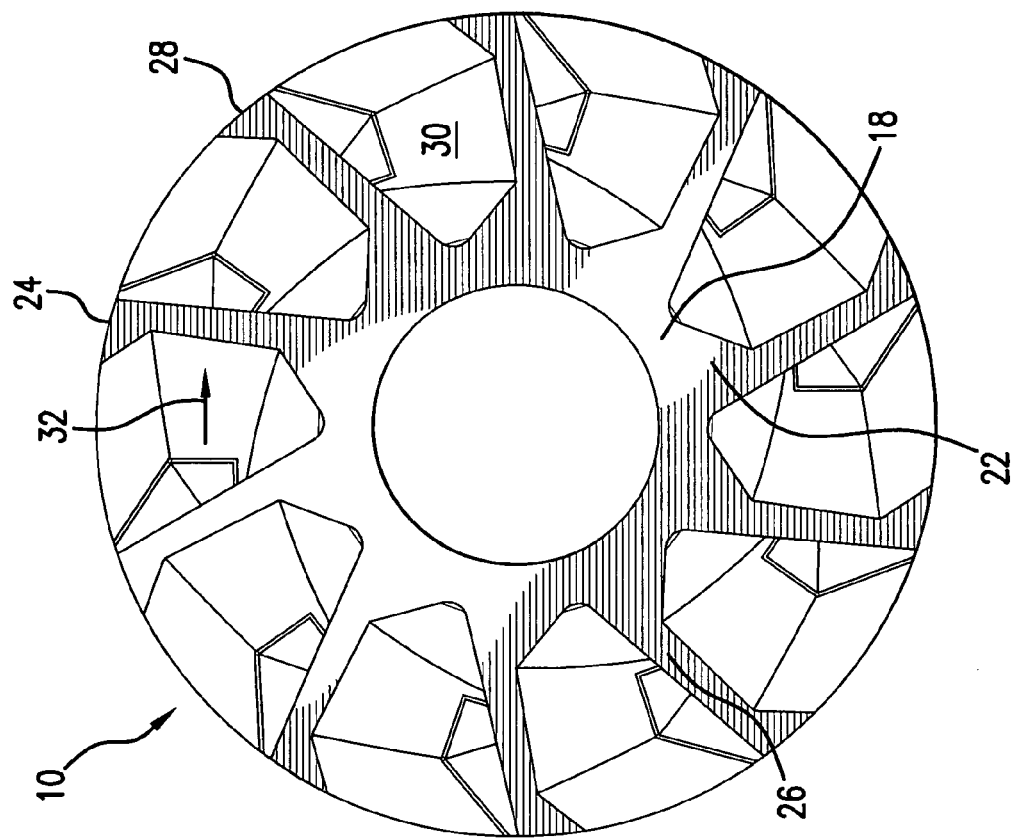
FIG. 6 is a front view of an entrainment system, according to one embodiment of this invention
Figure 5:
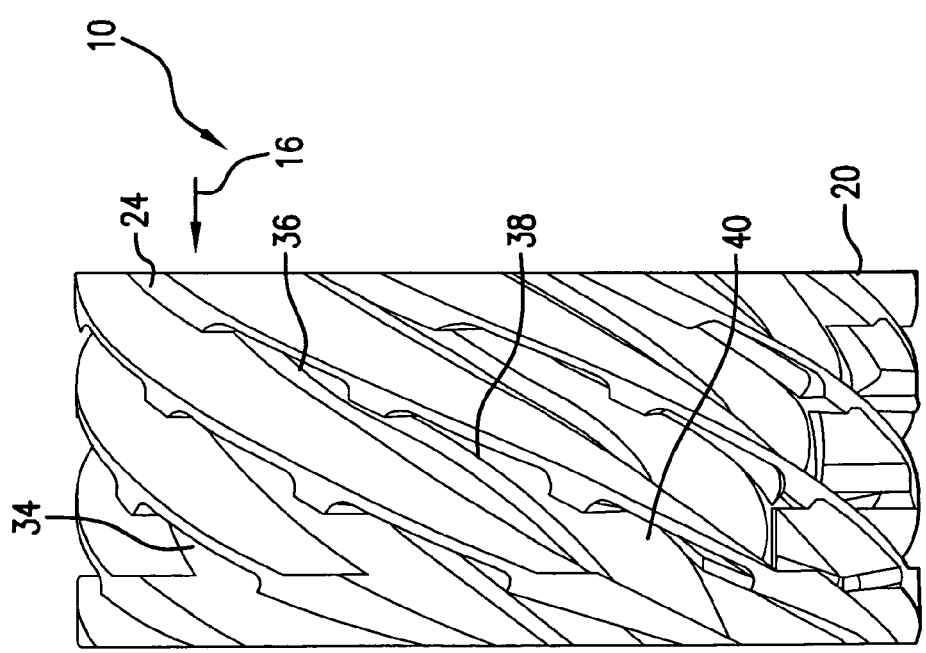
FIG. 5 is a side view of an entrainment system, according to one embodiment of this invention.

According to one embodiment of this invention and as shown in FIGS. 3, 5 and 6, entrainment system 10 includes an elongate or axial body 18 having an upstream or first end 20 opposite a downstream or second end 22. Entrainment system 10 may be used with gas turbines and particularly engines utilizing vortex burning combustion chambers 54, vortex burning inter-turbine burners 56 and combinations thereof. Entrainment system 10 may have any suitable size and/or shape. According to one embodiment of this invention, entrainment system 10 comprises a generally cylindrical shape. Desirably, first end 20 of axial body 18 is in fluid communication with air compressor 48 and second end 22 of axial body 18 is in fluid communication with power turbine 50.

According to an embodiment of this invention, instead of using a straight axial flow for non-combustion gases 16, entrainment system 10 changes the flow direction by swirling it under the burner itself, not axially, but helically (about 22°, for example) thus greatly increasing the dwell time or residence time of gasses transitioning under the burner, improving mixing and increasing the efficiency of the burner. Furthermore, to compensate for the loss in flow area due to the switch in geometry from an axial flow to a helical flow, the passages diverge both in width and in depth as they cross under the burner to limit Raleigh losses associated with hot mixing of airflows at high airflow speeds. Entrainment system 10 may provide mixing by direct impingement, static mixing, creation of turbulence and/or any other suitable mechanism.

Entrainment system 10 may include any suitable material. Desirably, entrainment system 10 includes materials to withstand direct impingement of or contact with flames from the combustion of fuel 14. According to an embodiment of this invention, entrainment system 10 includes a unitary metallic structure, such as, for example, superalloys (alloys exhibiting excellent mechanical strength and creep resistance at high temperatures, good surface stability corrosion resistance and oxidation resistance with an austenitic face-centered cubic crystal structure comprising a base alloying element of nickel, cobalt and/or nickel-iron), 309 stainless steel (austinetic stainless steel with nickel and chrome), INCONEL 718 (precipitation hardenable nickel-based alloy), INCONEL 625 (nonmagnetic, corrosion resistant and oxidation resistant nickel-based alloy), HASTALLOY X (Hast-X, nickel, chromium, iron, molybdenum alloy with oxidation resistance) and/or any other suitable metal. Desirably, a metallic entrainment system 10 is effusion cooled, such as, by laser drilling a multitude of very small bores in the walls of the part to allow cooling air through to keep the base metal from melting.

Suitable methods of manufacture may include casting, forging, machining, heat treating, pressing, tempering, welding and/or any other suitable process.

In another embodiment of this invention, entrainment system 10 includes a monolithic ceramic structure, such as, for example, silicon nitride and/or any other suitable matrix of non-metallic and/or metallic minerals. Minerals broadly include natural and/or synthetic solid homogeneous crystalline chemical elements and/or compounds resulting from typically inorganic processes. Desirably, but not necessarily, ceramic parts run or operate hot without additional cooling requirements. Alternately, entrainment system 10 may include supplemental cooling, such as, by additional air, liquid circulating coolant and/or any other suitable mechanism to remove a sufficient quantity of thermal energy.

Entrainment system 10 may include a plurality or more than one helical vane 24 radially disposed with respect to axial body 18. Desirably, each vane 24 has root 26 attached to axial body 18 and tip 28 radially disposed opposite root 26. Vanes 24 may include any desirable size, height and/or shape. According to one embodiment of this invention, vanes 24 include a complex multi-planar variable geometry relative to axial and/or radial positions with respect to axial body 18.

Entrainment system 10 may include any suitable number of vanes 24. Desirably, entrainment system 10 includes about two vanes 24 corresponding to each fuel orifice of vortex burning combustion chamber 54. According to one embodiment of this invention, entrainment system 10 includes between about 5 and about 15 vanes 24. In another embodiment of this invention, entrainment system 10 includes between about 8 and about 12 vanes 24. In yet another embodiment, axial body 18 includes 10 vanes 24.

Desirably, vanes 24 are generally equally radially disposed circumferentially with respect to axial body 18. Vanes 24 may include a leading or high pressure side oriented with respect to first end 20. Vanes 24 may include a trailing or low pressure side oriented with respect to second end 22 and generally opposite the leading side. Vanes 24 may include any suitable length 44 and/or thickness 42. Vanes 24 may include any suitable angle. According to one embodiment of this invention, the helical pitch of vanes 24 is a sharp 22.5 degrees and the net traversal of each vane 24 as it interfaces with the burner is 90 degrees.

Entrainment system 10 further includes a plurality of or more than one trenches 30 formed by helical vanes 24 where each trench 30 radially receives at least a portion of combustion gases 12 from tip 28 towards root 26 and each trench 30 receives at least a portion of non-combustion gases 16 from first end 20 of axial body 18 to second end 22 of axial body 18 in helical flow path 32 to quench or cool combustion gases 12 with non-combustion gases 16. Any suitable number of trenches 30 is possible. Desirably, but not necessarily, the number of trenches 30 corresponds to the number of vanes 24. According to one embodiment of this invention, entrainment system 10 includes between about 5 trenches 30 and about 15 trenches 30, desirably between about 8 trenches 30 and about 12 trenches 30 and more desirably about 10 trenches 30.

Mixing is a function of flowrates, geometries, flow regimes (turbulence), temperatures and compositions, for example. Desirably, it is within trench 30 that the gases from the combustor mix with the entrainment flows.

Without being bound by theory, the entrainment system 10 works by creating controlled low wake pressures downstream of the vortex burner using the entrainment flows. The low wake pressures tend to draw the rotating combustor gases residing in the vortex chamber gradually down into the entrainment flows. The highly helical nature of the entrainment vanes 24 and trough passages are highly effective in drawing tongues of hot combustor products into the entrainment flows.

Flow path 32 desirably provides the needed residence time for sufficient mixing of combustion gases 12 with non-combustion gases 16 to result in substantially uniform and/or equal temperatures of exit gases from entrainment system 10, regardless of polar and/or radial locations. Residence time in flow path 32 of trench 30 formed by vanes 24 and axial body 18 can be varied by changing a helical angle for flow path 32 with respect to an axis of axial body 18. Any suitable angle is possible. According to one embodiment of this invention, helical flow path 32 includes an angle from an axis of the axial body of between about 45 degrees and about 85 degrees. In another embodiment of this invention, the angle of flow path 32 is between about 65 degrees and about 70 degrees from an axis of the axial body.

Effective length refers to an average distance a gas molecule travels from entering entrainment system 10 at first end 20 in trench 30 along curved or helical flow path 32 before exiting second end 22. Desirably, the effective length is greater than the axial length of axial body 18. Axial body 18 usually has a length of about the width of vortex burning combustion chamber 54. Effective length may include any multiples of the length of axial body 18. According to one embodiment of this invention, the effective length is at least about 1.2 times an axial length of the axial body. In another embodiment of this invention, the effective length is between about 1.4 times and about 4.0 times an axial length of the axial body.

Helical vane 24 may include at least one groove or radial cavity 34 formed in a leading side or high pressure side of helical vane 24 for conducting combustion gases 12 into trench 30 and increasing mixing. Radial cavities 34 may run completely from the top or tip 28 of the blade or vane 24 to the bottom or root 26. Any suitable number of radial cavities 34 is possible. According to one embodiment of this invention, each helical vane 24 includes three radial cavities 34. Radial cavities 34 may be located at any suitable position along length 44 of helical vane 24.

Radial cavities 34 function to 1) provide a conduit for the hot gases exiting the circumferential cavity down into the entrainment passage and 2) form bluff bodies causing vortices, disturbances and/or turbulence in and through the flow to promote better uniformity, higher mix rates and flame holding during the mixing process.

According to one embodiment of this invention, first radial cavity 36 is disposed at between about 15 percent and about 35 percent of length 44 of helical vane 24, second radial cavity 38 is disposed at between about 40 percent and about 60 percent of length 44 of helical vane 24 and third radial cavity 40 is disposed at between about 65 percent and about 85 percent of length 44 of helical vane 24. In another embodiment of this invention, first radial cavity 36 is disposed at between about 20 percent and about 30 percent of length 44 of helical vane 24, second radial cavity 38 is disposed at between about 45 percent and about 55 percent of length 44 of helical vane 24 and third radial cavity 40 is disposed at between about 70 percent and about 80 percent of length 44 of helical vane 24. In a third embodiment of this invention, first radial cavity 36 is disposed at about 25 percent of length 44 of helical vane 24, second radial cavity 38 is disposed at about 50 percent of length 44 of helical vane 24 and third radial cavity 40 is disposed at about 75 percent of length 44 of helical vane 24.

Radial cavity 34 includes any suitable depth with respect to vane thickness 42. According to an embodiment of this invention, a depth of each radial cavity 34 is between about 10 percent and about 50 percent of thickness 42 of the helical vane 24. In another embodiment of this invention, a depth of each radial cavity 34 is between about 25 percent and about 35 percent of thickness 42 of helical vane 24. In a third embodiment of this invention, a depth of each radial cavity 34 is about 30 percent of thickness 42 of helical vane 24.

Radial cavity 34 includes any suitable length with respect to length 44 of helical vane 24, as measured at tip 28, for example. According to one embodiment of this invention, a length of each radial cavity 34 is between about 10 percent and about 30 percent of length 44 of helical vane 24. In another embodiment of this invention, a length of each radial cavity 34 is between about 15 percent and about 25 percent of length 44 of the helical vane 24. In a third embodiment of this invention, a length of each radial cavity 34 is between about 17 percent and about 23 percent of length 44 of the helical vane 24. In fourth embodiment of this invention, a length of each radial cavity 34 is 20 percent of length 44 of the helical vane 24.

Desirably, a profile or cross section of each trench 30 has as a canted V-shape at tip 28 as it widens and deepens into a parallelogram shape at root 26. This variable radial geometry further improves mixing and draws combustion gases 12 and/or flames into trench 30. According to an embodiment of this invention, a width of each trench 30 increases along length 44 of each helical vane 24 from first end 20 of axial body 18 to second end 22 of axial body 18. This variable helical geometry helps to reduce pressure and/or Raleigh losses. The diverging nature of the passages as gases flow downstream limit Raleigh losses by reducing flow speeds of the net mix.

Entrainment system 10 may include trenches 30 having any suitable tilted angle. According to one embodiment of this invention, each trench 30 is tilted, angled and/or canted between about 2 degrees and about 20 degrees from root 26 to tip 28 toward first end 20 of axial body 18 for mixing combustion gases 12 and non-combustion gases 16. In another embodiment of this invention, each trench 30 is tilted between about 8 degrees and about 12 degrees from root 26 to tip 28 toward first end 20 of axial body 18 for mixing combustion gases and non-combustion gases. Desirably, the tilt is about 10 degrees, for example, so the passages themselves are tilted about 10 degrees from true radial orientation into the direction of the swirling flow in the circumferential cavity to help promote extraction of the fast moving gases of the vortex chamber and force mixing with the entrainment trough flows.

According to an embodiment of this invention, the low pressure side of vane 24 has a taper running to tip 28. The taper covers about 50 percent of vane thickness 40 at tip 28 and goes down 50 percent of a blade height as measured at an entry point. The taper gradually recedes to about half that value when reaching the flow exit point. The function of this taper is to provide a surface for the flow to attach to as it is drawn down into the cavity to prevent the formation of a flow "dead-zone" which allows cold gases to bypass the mixing process and create cold zones in the exit flow path, without being bound by theory.

According to an embodiment of this invention, helical vanes 24 also form flange 46 at tip 28. Flange 46 forms a generally wider or thicker shape than vane thickness 42. Flange 46 may form additional turbulence and mixing.

Figure 7:
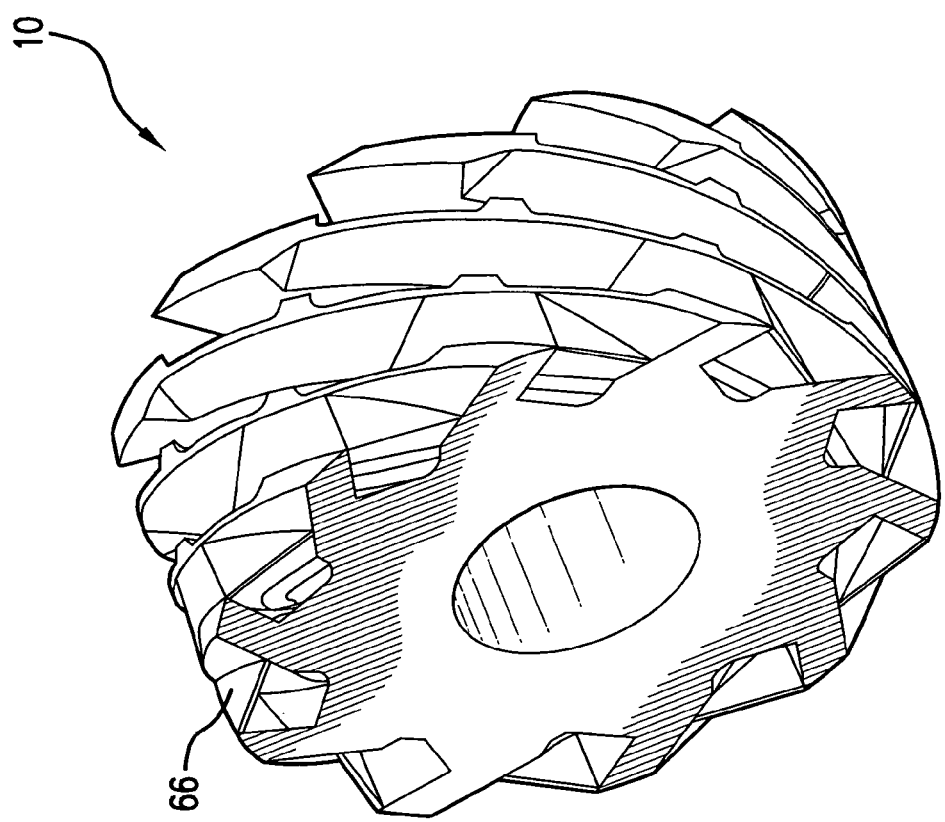
FIG. 7 is an isometric view of an entrainment system having a splay deflector, according to one embodiment of this invention.

According to an embodiment of this invention and as shown in FIG. 7, splay deflector 66 bridges across each trench 30 with respect to first end 20 of axial body 18 and tip 28 of each helical vane 24 forming each trench 30. Desirably, spay deflector 66 directs at least a portion of non-combustion gases 16 radially and/or outward. Advantageously, splay deflector 66 allows a reduced or even eliminated split of combustion gases 12 and non-combustion gases 16, allowing for a lighter, a simpler and/or a more compact gas turbine.

Splay deflector 66 may have any suitable length, such as, about 5 percent to about 50 percent a length of vane length 44, desirably, about 10 percent to about 20 percent of vane length 44, and more desirably about 15 percent. Spay deflector 55 may include a leading edge having at least one angled surface deflecting and/or guiding at least a portion of the discharge of air compressor 48 for mixing with fuel 14 and burning fuel 14 before recombining with the rest of the discharge of the compressor 48 in trench 30 of entrainment system 10, for example. The angled surface may be described as dipping down into the flow path 32.

Splay deflector 66 may split any suitable amount of the discharge of air compressor 48, such as, between about 0 percent and about 50 percent, desirably between about 20 percent and about 40 percent and more desirably about 30 percent.

This invention also includes the method of operation of a gas turbine having entrainment system 10. According to an embodiment of this invention, the method for mixing combustion and non-combustion gases in a gas turbine includes: the step of compressing ambient air in air compressor 48 forming compressed air, the step of splitting the compressed air into combustion air 60 and non-combustion gases 16, the step of mixing fuel and combustion air in a vortex combustion device, the step of burning fuel 14 and combustion air 60 in a radial burner forming combustion gases 12, the step of quenching combustion gases 12 with the non-combustion gases 16 to form quenched gases in entrainment system 10 having helical canted vanes 24 forming trenches 30, and the step of powering turbine 50 with at least a portion of the quenched gases.

According to an embodiment of this invention, the step of splitting includes the combustion air 60 being between about 15 percent and about 40 percent of a mass of the compressed air and the non-combustion gases 16 being between about 60 percent and about 85 percent of the mass of the compressed air. Desirably, a drawdown of combustion gases 12 into trench 30 occurs between about 30 percent and about 65 percent of length 44 of the canted helical vane 24. In embodiments of this invention with spay deflector 66, the method includes splitting the gasses in and/or within entrainment system 10.

According to an embodiment of this invention, mixing of fuel 14 and combustion air 60 occurs at between about 10 meters per second and about 60 meters per second, burning of fuel 14 and combustion air 60 occurs at between about 1,500 degrees Celsius and about 2,000 degrees Celsius and quenching results in quenched gases having a uniform temperature of between about 975 degrees Celsius and about 1,375 degrees Celsius.

EXAMPLE

During tests of an embodiment of entrainment system 10, the following results were observed: 1) successful drawdown of hot gasses occurs within all three of the radial cavities 34 on the high pressure side of the entrainment vanes 24, 2) successful drawdown of gases along the low pressure side of vane 24 starts at about 30% of length 44 and is completely drawn down to the low pressure side blade root by the 65% length point and 3) during rig tests a hot gas stream occurs at the entrainment exit root.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A gas turbine entrainment system for mixing combustion gases and non-combustion gases, the entrainment system comprising:
   an axial body having a first end and a second end;
   a plurality of helical vanes radially disposed with respect to the axial body, each of the helical vanes having a root attached to the axial body and a tip opposite the root; and
   a plurality of trenches formed by the helical vanes, each trench radially receiving combustion gases from the tip towards the root, each trench receiving non-combustion gases from the first end of the axial body to the second end of the axial body in a helical flow path to quench the combustion gases with the non-combustion gases.

2. The entrainment system of claim 1 wherein the helical flow path is between about 45 degrees and about 85 degrees from an axis of the axial body.

3. The entrainment system of claim 1 wherein helical flow path has an effective length of at least about 1.2 times an axial length of the axial body.

4. The entrainment system of claim 1 wherein the plurality of helical vanes comprises between about 5 helical vanes and about 15 helical vanes generally equally radially disposed circumferentially with respect to the axial body.

5. The entrainment system of claim 1 further comprising at least one radial cavity formed in a leading side of each helical vane for conducting combustion gases into the trench and increasing mixing.

6. The entrainment system of claim 5 wherein:
   a first radial cavity is disposed at between about 15 percent and about 35 percent of a length of the helical vane;
   a second radial cavity is disposed at between about 40 percent and about 60 percent of the length of the helical vane; and
   a third radial cavity is disposed at between about 65 percent and about 85 percent of the length of the helical vane.

7. The entrainment system of claim 5 wherein a depth of each radial cavity is between about 10 percent and about 50 percent of a thickness of the helical vane.

8. The entrainment system of claim 5 wherein a length of each radial cavity is between about 10 percent and about 30 percent of a length of the helical vane.

9. The entrainment system of claim 1 wherein:
   the first end of the axial body is in fluid communication with an air compressor; and
   the second end of the axial body is in fluid communication with a power turbine.

10. The entrainment system of claim 1 wherein the gas turbine comprises at least one of the group consisting of vortex burning combustion chambers, vortex burning inter-turbine burners and combinations thereof.

11. The entrainment system of claim 1 wherein a profile of each trench has as a canted V-shape at the tip and widens into a parallelogram shape at the root.

12. The entrainment system of claim 11 wherein a width of each trench increases along a length of each helical vane from the first end of the axial body to the second end of the axial body.

13. The entrainment system of claim 11 wherein each trench is tilted between about 2 degrees and about 20 degrees from the root to the tip toward the first end of the axial body for mixing combustion gases and non-combustion gases.

14. The entrainment system of claim 1 further comprising a splay deflector bridging across each trench with respect to the first end of the axial body and the tip of each helical vane forming each trench, the spay deflector directing a portion of the non-combustion gases radially outward.

15. A gas turbine entrainment system for mixing combustion gases and non-combustion gases, the entrainment system comprising:
   an axial body having a first end and a second end, the axial body disposed within an inner radius of a vortex combustion chamber;
   ten helical vanes generally equally radially disposed circumferentially with respect to the axial body, each of the helical vanes having a root attached to the axial body and a tip opposite the root;
   ten trenches formed by the helical vanes, each trench radially receiving combustion gases from the tip towards the root, each trench is tilted between about 8 degrees and about 12 degrees from the root to the tip toward the first end of the axial body, each trench receiving non-combustion gases from the first end of the axial body to the second end of the axial body in a helical flow path to quench the combustion gases with the non-combustion gases, wherein the helical flow path is between about 65 degrees and about 70 degrees from an axis of the axial body;
   a first radial cavity having a depth of between about 25 percent and about 35 percent of a thickness of the helical vane and a length of between about 15 percent and about 25 percent of a length of the helical vane, the first radial cavity is disposed at between about 20 percent and about 30 percent of the length of the helical vane;
   a second radial cavity having a depth of between about 25 percent and about 35 percent of the thickness of the helical vane and a length of between about 15 percent and about 25 percent of the length of the helical vane, the second radial cavity is disposed at between about 45 percent and about 55 percent of the length of the helical vane;
   a third radial cavity having a depth of between about 25 percent and about 35 percent of the thickness of the helical vane and a length of between about 15 percent and about 25 percent of the length of the helical vane, the third radial cavity is disposed at between about 70 percent and about 80 percent of the length of the helical vane;
   a profile of each trench has a canted V-shape at the tip and widens into a parallelogram shape at the root; and
   a width of each trench increases along the length of the helical vane from the first end of the axial body to the second end of the axial body.

16. A method of mixing combustion and non-combustion gases in a gas turbine, the method comprising:
   compressing ambient air in an air compressor forming compressed air;
   splitting the compressed air into combustion air and non-combustion gases;
   mixing fuel and combustion air in a vortex burning combustion chamber including an inner radius and an entrainment system within the inner radius;
   burning fuel and combustion air in the vortex burning combustion chamber, forming combustion gases;
   quenching the combustion gases with the non-combustion gases in an entrainment system including an axial body and, disposed within the axial body, helical canted vanes forming trenches, each vane including a root and a tip opposite the root, the quenching forms quenched gases; and powering a turbine with the quenched gases;

wherein each trench receives combustion gases from the tip toward the root of a corresponding helical canted vane, and each trench receives non-combustion gases from a first end of the axial body to a second end of the axial body in a helical flow path to quench the combustion gases with the non-combustion gases.

17. The method of claim 16 wherein the combustion air is between about 15 percent and about 40 percent of a mass of the compressed air and the non-combustion gases is between about 60 percent and about 85 percent of the mass of the compressed air.

18. The method of claim 16 wherein a drawdown of the combustion gases into the trench occurs between about 30 percent and about 65 percent of the length of the canted helical vane.

19. The method of claim 16 wherein:

mixing of the fuel and combustion air occurs at between about 10 meters per second and about 60 meters per second;

burning of the fuel and combustion air occurs at between about 1,500 degrees Celsius and about 2,000 degrees Celsius; and quenching results in quenched gases having a uniform temperature of between about 975 degrees Celsius and about 1,375 degrees Celsius.

20. The method of claim 16 wherein splitting occurs within the entrainment system having a splay deflector.

\* \* \* \* \*